United States Patent
Inoue et al.

(10) Patent No.: US 7,914,222 B2
(45) Date of Patent: Mar. 29, 2011

(54) TIP UNIT FOR LIQUID APPLICATOR, METHOD FOR PRODUCING THE SAME, AND LIQUID APPLICATOR HAVING THE TIP UNIT

(75) Inventors: Hiroshi Inoue, Higashiosaka (JP); Norimasa Kurihara, Shijonawate (JP); Shoko Matsumoto, Tokyo (JP); Kyoko Sano, Nara (JP); Takeshi Omatsu, Kyotanabe (JP); Shigeki Yoneda, Neyagawa (JP); Yasunori Nakatani, Nishinomiya (JP); Hiroyoshi Yamamoto, Kobe (JP); Kozaburo Fujita, Yao (JP)

(73) Assignee: Sakura Color Products Corporation (JP)

( * ) Notice: Subject to any disclaimer, the term of this patent is extended or adjusted under 35 U.S.C. 154(b) by 1095 days.

(21) Appl. No.: 10/558,792

(22) PCT Filed: May 26, 2004

(86) PCT No.: PCT/JP2004/007561
§ 371 (c)(1), (2), (4) Date: Nov. 28, 2005

(87) PCT Pub. No.: WO2004/106087
PCT Pub. Date: Dec. 9, 2004

(65) Prior Publication Data
US 2007/0110507 A1    May 17, 2007

(30) Foreign Application Priority Data

May 27, 2003   (JP) .................................. 2003-149491
May 27, 2003   (JP) .................................. 2003-149512
May 27, 2003   (JP) .................................. 2003-149640

(51) Int. Cl.
*B43K 7/10*          (2006.01)
(52) U.S. Cl. ........... 401/216; 401/209; 401/208; 15/445
(58) Field of Classification Search .......... 401/208–217, 401/219, 220; 15/435, 444, 445; 29/441.1, 29/441.2
See application file for complete search history.

(56) References Cited

U.S. PATENT DOCUMENTS 2,551,490 A  *  5/1951  Ferst et al. .................... 401/216
(Continued)

FOREIGN PATENT DOCUMENTS
GB          814734 A  *  6/1959

*Primary Examiner* — David J. Walczak
*Assistant Examiner* — Keegan Gumbs
(74) *Attorney, Agent, or Firm* — Wood, Phillips, Katz, Clark & Mortimer (57) ABSTRACT

A tip unit (1) incorporated in a liquid applicator such as a ball-point pen, the tip unit being capable of an increased rate of liquid discharge with no leaking or clogging problem. To achieve it, the tip unit (1) is accommodated in a tip body (11) having a ball housing (15), a ball (10), a capillary hole (16), and a proximal bore, the ball housing (15) being a passage for allowing liquid to flow therethrough, the ball (10) being rotatively held in the ball housing (15). The ball housing (15) is provided with at least one ink channel (47) adapted to communicate the ball housing (15) with the capillary hole (16) or the proximal bore. The ball housing (15) has a ball resting seat (45) and a side wall (41) that are connected by a connecting surface (71) having a shape of a truncated conical surface with its apex toward the distal end of the tip unit (1).

11 Claims, 12 Drawing Sheets

U.S. PATENT DOCUMENTS

| | | | |
|---|---|---|---|
| 2,592,406 A * | 4/1952 | Faltin | 401/216 |
| 2,967,353 A * | 1/1961 | Arengo | 401/216 |
| 3,030,926 A * | 4/1962 | Sattman | 401/214 |
| 3,048,148 A * | 8/1962 | Sirianni | 401/216 |
| 3,163,166 A * | 12/1964 | Migliarese et al. | 604/20 |
| 4,139,313 A * | 2/1979 | Hori | 401/216 |
| 4,529,329 A * | 7/1985 | Hirabayashi et al. | 401/216 |
| 4,842,433 A * | 6/1989 | Otsuka | 401/216 |
| 5,104,249 A * | 4/1992 | Elsner et al. | 401/216 |
| 5,810,495 A * | 9/1998 | McAuley | 401/214 |
| 6,179,505 B1 * | 1/2001 | Oder et al. | 401/213 |
| 6,283,662 B1 * | 9/2001 | Inoue et al. | 401/216 |
| 6,299,375 B1 * | 10/2001 | Abe | 401/214 |
| 6,422,776 B1 * | 7/2002 | Nakatani | 401/216 |
| 6,887,008 B2 * | 5/2005 | Kitao et al. | 401/216 |

\* cited by examiner

TIP UNIT FOR LIQUID APPLICATOR, METHOD FOR PRODUCING THE SAME, AND LIQUID APPLICATOR HAVING THE TIP UNIT

BACKGROUND OF THE INVENTION

1. Field of the Invention

The present invention relates generally to a tip unit for a liquid applicator such as a water-based ball-point pen, and also a method of producing thereof. The invention also relates to a ball-point pen tip unit allowing liquid to be discharged in a relatively large rate and a method of producing thereof. In this specification, the writing instrument is considered as a kind of ink applicator in the broad meaning of the word.

2. Background Art

A liquid applicator having a ball placed into its distal part is conventionally known, wherein the ball transfers liquid, which adheres to the ball, onto the surface to be applied by being pressed. A typical example is a ball-point pen, which uses ink as the liquid. Inks of various kinds such as dyes or pigments dispersed in water, called "water-based inks" are known, as well as "water-based ball-point pens" containing such inks. "Water-based gel inks", i.e., gelatinized inks are also used. Some ball-point pens using water-based gel ink can deliver a relatively large rate of ink.

The tip unit incorporated in the ball-point pen includes a ball for writing rotatively retained in a tip body, and while the ball-point pen is used, the ball rolls to transfer the ink from an ink reservoir to the writing surface such as a paper through the ball.

Figure 17A:
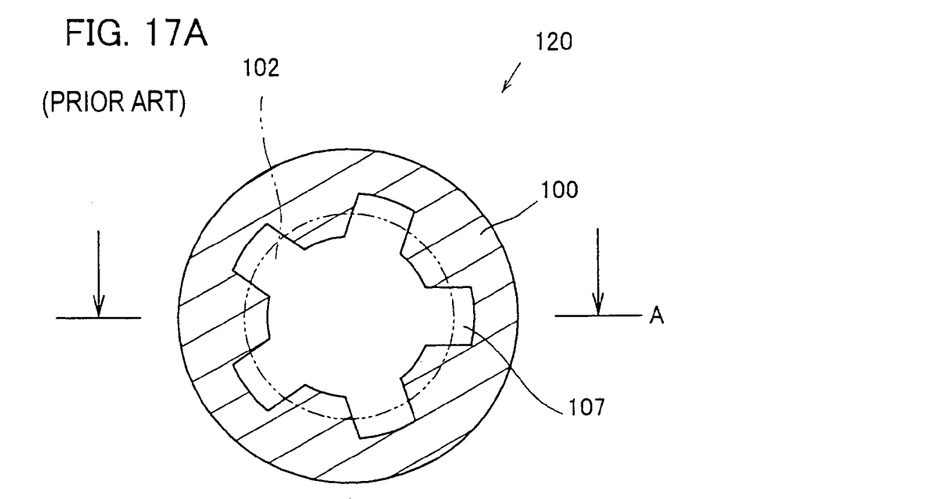
FIG. 17A is a radial cross-section showing a distal end portion of a known tip unit.
Figure 17B:
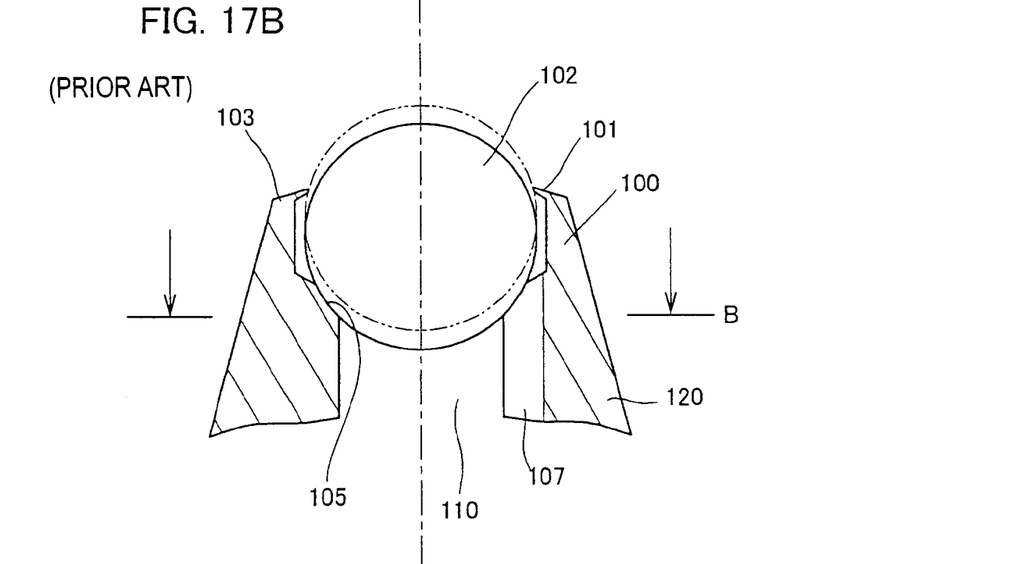
FIG. 17B is a longitudinal cross-section on a large scale showing the distal end portion of the tip unit shown in FIG. 17A.

The known tip unit used in the ball-point pen will be described:

Referring to FIG. 17A, which is a cross-section showing the distal end of a tip unit 120, the tip unit 120 is mainly composed of a tip body 100 and a ball 102. The distal end of the tip body 100 is shaped like a truncated cone. The ball 102 is retained in a ball housing (a socket) 103, and is held by the distal end 101 of the tip body 100.

The tip body 100 is provided with the ball housing 103 shaped in concave at its distal end, and a capillary hole 110 at its proximal end. The ball housing 103 is provided with a ball resting seat or merely seat 105 having a conical inner surface. The tip body 100 is further provided with ink channels 107 each communicating with the seat 105. The ink channels 107 secure smooth flow of liquid when the ball-point pen is used. The liquid flows toward the distal end 101 through the capillary hole 110 along the ink channels 107. This construction keeps the liquid flow even with the ball 102 pushed toward the seat 105 in using the ball-point pen, so as to apply the liquid.

Figure 18:
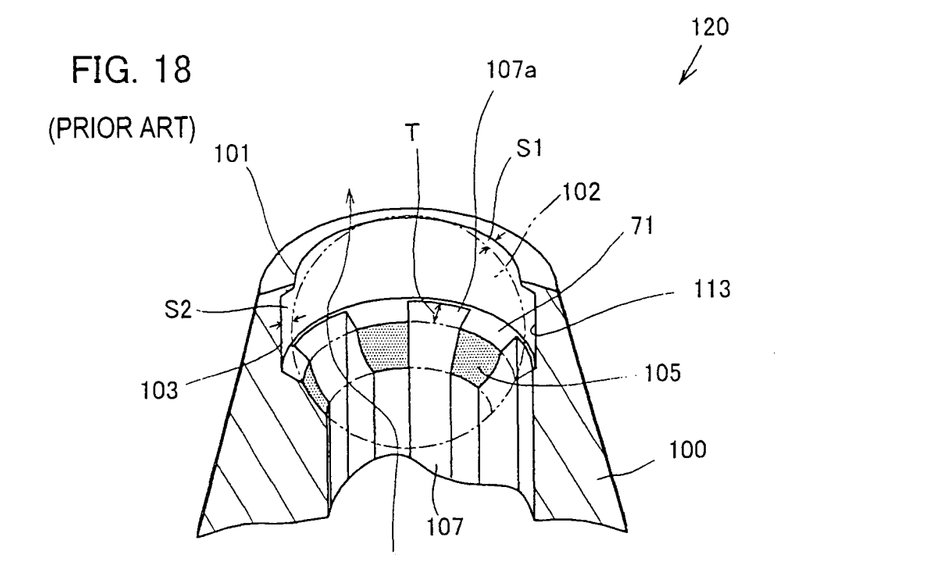
FIG. 18 is a perspective view showing a distal end portion of the known tip unit.

Referring to FIG. 18, the flow of liquid in writing with the ball-point pen will be described:

In using the ball-point pen, the liquid in the tip unit 120 flows through the ink channels 107 via the capillary hole 110, and reaches the ball housing 103 through outlets 107a of the ink channels 107 located near the ball housing 103. Then, the liquid flows out through a gap around the ball 102 in the distal end 101 of the tip body 100. The liquid flows in the direction indicated by the arrow in FIG. 18 when the pen is in use.

The seat 105 of the ball housing 103 is processed by a so-called "tapping," wherein the ball 102 inserted in the ball housing 103 is lightly pressed down (or tapped) toward the seat 105 on its head. This tapping causes the surface of the seat 105 to be concave so as to enable the ball 102 to rest on the seat 105 with a narrow gap between the ball 102 and the top open end of the tip body 100. In the case of a ball-point pen using water-based ink, the tapping takes place after the top open end at the distal end 101 of the tip body 100 is pressed.

The tip unit 120 is known, with the ball 102 being urged toward the distal end so as to prevent the liquid from leaking out. This ensures that when the applicator is not used, the ball 102 is urged by a spring toward the distal end, so as to be brought into full contact with the distal end 101 of the tip body 100, and when it is used (in writing), the ball 102 is pushed back toward the seat 105, so as to release the contact.

A liquid applicator such as a ball-point pen using the above-mentioned tip unit 120 is capable of writing with the liquid led out with the ball 102 pushed against the seat 105 and rotating. In some instances, an increased amount of liquid discharge is required.

In order to meet this requirement, the liquid passage from the capillary hole 110 to the distal end 101 of the tip body 1100 must be widened as much as desired.

However, as shown in FIG. 18, the liquid passage especially becomes narrow at three spots; that is, 1) near the outlet 107a of the ink channel 107, 2) near the spot at which the ball 102 is nearest a side wall 113 of the ball housing 103, and 3) near the gap around the ball 102 between the distal end 101 of the tip body 100.

Figure 19:
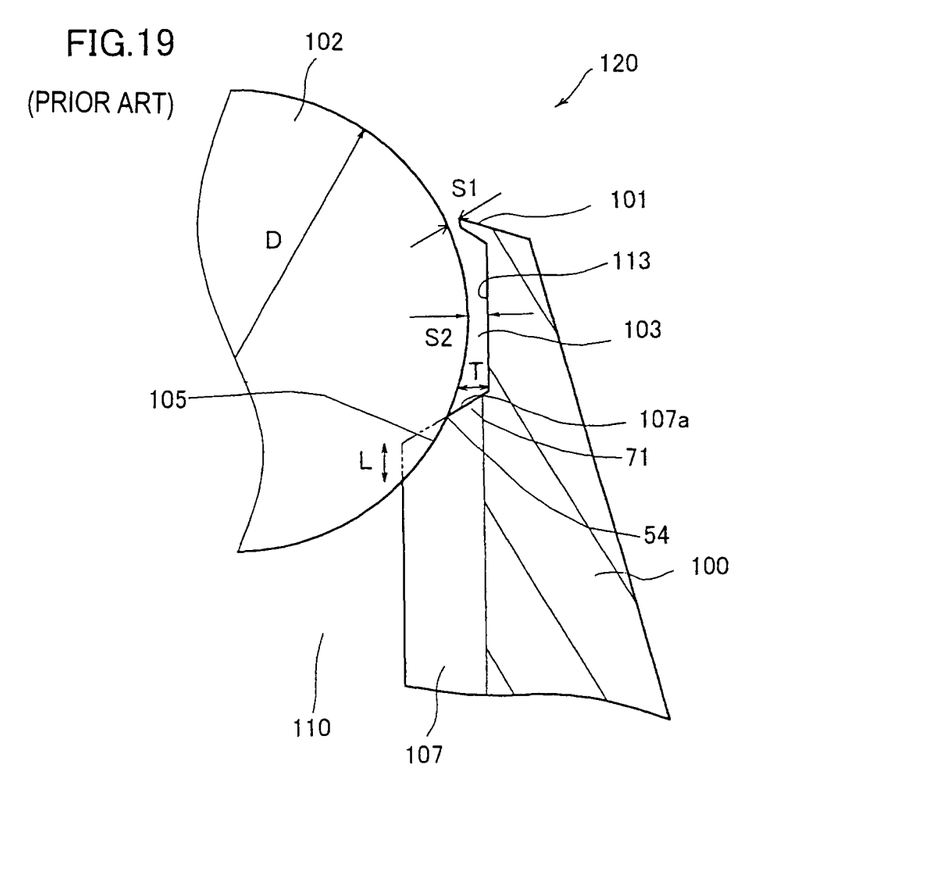
FIG. 19 is a cross-section on a large scale showing a spot where a ball in the known tip unit is kept in contact with the tip body.

More specifically, referring to FIG. 19, the tip unit 120 has three gaps T, S1, and S2. The gap T exists around the ball 102 near the outlet 107a of the ink channel 107, the gap S2 exists near the spot at which the ball 102 is nearest the side wall 113 of the ball housing 103, and the gap S1 exists near the gap around the ball 102 between the distal end 101 of the tip body 100. The ink passage becomes most narrow at these gaps T, S1 and S2.

As described above, the tapping takes place after the top open end at the distal end 101 of the tip body 100 is pressed and deformed. This tapping deforms the seat 105, thereby enabling the ball 102 to move in an axial direction (in a direction of ball displacement) as much as a deformed amount L. In this specification, "deform" or "deformation" does not mean that the object is spoiled but means that it is changed in shape.

In order to increase a liquid discharge rate, it is preferable to widen all the gaps S1, S2, and T, but it is difficult to widen both of the gaps S1 and T in the conventional liquid applicator, resulting in limiting an increased rate of liquid discharge.

The reason why both of the gaps S1 and T are hard to be widened simultaneously is as follows:

As mentioned above, since the distal end 101 is pressed toward the ball 102 so as to bring it into close contact with the ball 102, and then it is lightly tapped, the larger the deformed amount L is, the wider the gap S1 near the distal end of the tip body 100 becomes. However, as the deformed amount L is wider, the gap T near the outlet 107a around the ball 102 becomes narrower.

More specifically, as shown in FIG. 18, the outlet 107a of the ink channel 107 and thereabout is blocked by the ball 102 because of location of the seat 105, thereby reducing the size of the gap T. This reduction in size prevents the liquid from flowing through the gap T and thereabout.

The present invention is therefore to provide a tip unit for a liquid applicator with more constantly adequate discharge of liquid. The invention is also to provide a method of producing a tip unit that is readily produced.

SUMMARY OF THE INVENTION

According to one aspect of the present invention, there is provided a tip unit for a liquid applicator, the tip unit including a tip body and a ball, the tip body holding the ball near the distal end thereof, the tip body having a ball housing adapted to hold the ball, a capillary hole, and a proximal bore, the ball housing, the capillary hole, and the proximal bore mutually communicating to form a passage for permitting liquid to flow, the ball housing having a side wall and a ball resting seat holding the ball rotatably and axially movably at a predetermined distance in the ball housing, the tip body further having a channel or a bore so as to enable the ball housing to communicate with the capillary hole and the proximal bore, the ball housing further having a connecting surface that connects the seat with the side wall and has a shape projecting toward the distal end of the tip body, the seat being located inside the connecting surface.

This structure has the connecting surface between the seat and the side wall of the ball housing, which surface has a shape projecting toward the distal end, and inside of which the seat is located, thereby ensuring that even if the ball is arranged to move over a relatively long distance, the outlet of the channel toward the ball housing is prevented from being clogged, so as to obtain a stable flow of liquid.

The connecting surface can have a shape of a truncated conical surface with its apex toward the distal end of the tip unit, wherein the truncated conical surface is a part of an imaginary cone and has the same shape as a side face of a trapezoidal rotator. The ball housing can also be provided with a recess at its bottom.

According to another aspect of the present invention, there is provided a method for producing a tip unit for a liquid applicator, wherein the tip unit includes a tip body and a ball, the tip body having a ball housing and a capillary hole, the ball housing having a side wall and a seat-side machined surface and holding the ball, the side wall having a shape of a cylindrical inner wall, the machined surface functioning as a bottom surface of the ball housing, the method including: a first step (internal machining step) of producing the tip body by drilling a solid material to form a ball housing and a capillary hole therein; a second step (ball placing step) of placing the ball into the ball housing; a third step (distal end deforming step) of deforming the distal end portion of the tip body toward the ball; a fourth step (seat deforming step) of pushing the ball from the distal end toward the capillary hole so as to deform a pressure-deformation surface constituting a part of the machined surface to form a seat, wherein in the first step a portion to be the pressure-deformation surface is formed to have a projecting portion toward the distal end of the tip body.

This method forms the portion to be the pressure-deformation surface so as to have the projecting portion toward the distal end in the first step, thereby ensuring that the area of the pressure-deformation surface becomes smaller for the same deformed amount and that its outer border is located inside, so as to widen the ink passage.

Further, the projecting portion to be the pressure-deformation surface can be located inside of the machined surface. This structure facilitates the formation of the ball resting seat.

In the first step, the pressure-deformation surface can be machined so as to form a first surface having a shape of a truncated conical surface with its apex toward the distal end of the tip unit.

By this method, the pressure-deformation surface is machined so as to form the first surface having a shape of a truncated conical surface with its apex toward the distal end of the tip unit in the first step, thereby ensuring that the area of the pressure-deformation surface becomes smaller for the same deformed amount and that its outer border is located inside, so as to widen the ink passage and facilitate the third step.

In the first step, a non-pressure surface, which is a portion of the seat-side machined surface not to be deformed in the fourth step or seat deformation step, can be formed so as to be flush with the first surface such that the whole seat-side machined surface is shaped into a truncated conical surface with its apex toward the distal end of the tip unit.

This method forms the non-pressure surface to be flush with the first surface such that the whole seat-side machined surface is shaped into a truncated conical surface with its apex toward the distal end of the tip unit, thereby facilitating the formation of the machined surface.

Furthermore, in the first step, a second surface not flush with the first surface can be formed in a portion in the pressure deformation surface that is continuous to the capillary hole, and the second surface can be a planar surface or a truncated conical surface with its apex toward the proximal end of the tip unit.

In the first step, the side wall of the ball housing can be arranged to be situated co-axially with the capillary hole. This facilitates the fabrication of the tip units.

It is further possible to provide a step (channel broaching step) of broaching (forming) a channel communicating the ball housing with the capillary hole or the proximal bore, thereby enabling liquid to flow smoothly when the tip unit is used. In the channel broaching step, the channel can be formed to be open in the capillary hole, thereby enabling liquid to flow more smoothly.

The first step can be processed by cutting, especially in forming the first surface.

The tip unit of the present invention can be incorporated in a liquid applicator. The liquid applicator can be a ball-point pen using a water-based ink or a water-based gel ink as the liquid to be applied. Further, the ball can be urged toward the distal end.

DESCRIPTION OF PREFERRED EMBODIMENTS

Figure 1A:
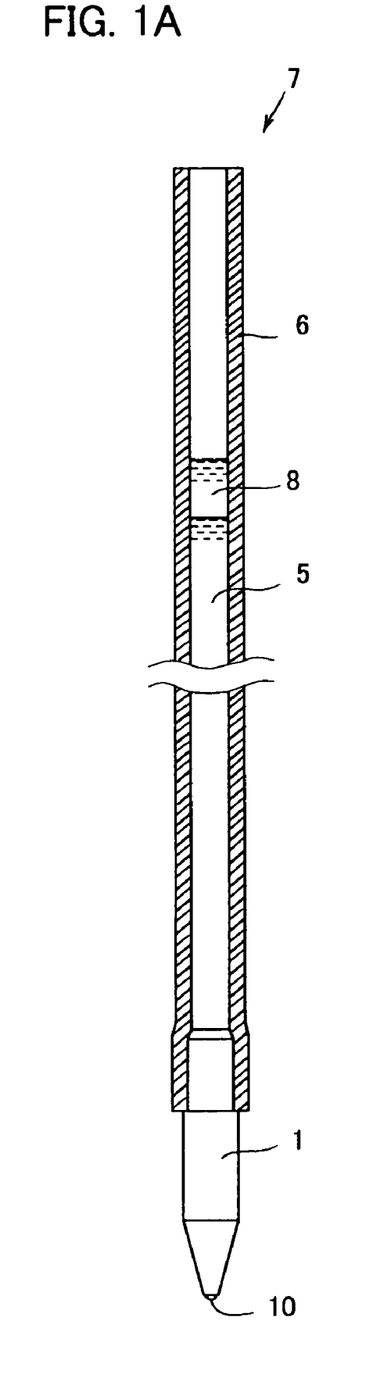
FIG. 1A is a cross-section showing a core unit having a tip unit produced in a first embodiment of the present invention.
Figure 1B:
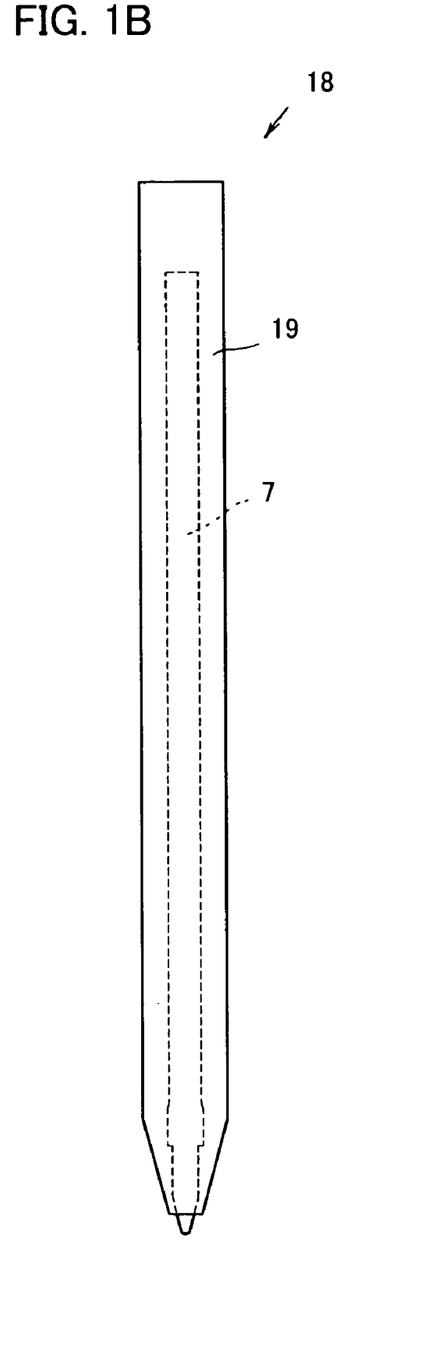
FIG. 1B is a front view showing a ball-point pen using the core unit shown in FIG. 1A.

FIG. 1A generally shows a core unit 7 including a tip unit 1 used in a ball-point pen (viz. liquid applicator) 18 in the first embodiment of the present invention. The tip unit 1 is installed in the core unit 7 at its distal end. Referring to FIG. 1A, the core unit 7 also includes an ink cylinder (a reservoir of the liquid to be applied) 6 containing ink 5 (liquid to be applied) such as a water-based ink or a water-based gel therein, the ink cylinder 6 communicating with the tip unit 1. Referring to FIG. 1B, the core unit 7 is inserted in a cylindrical shaft 19 of the ball-point pen 18.

Figure 2:
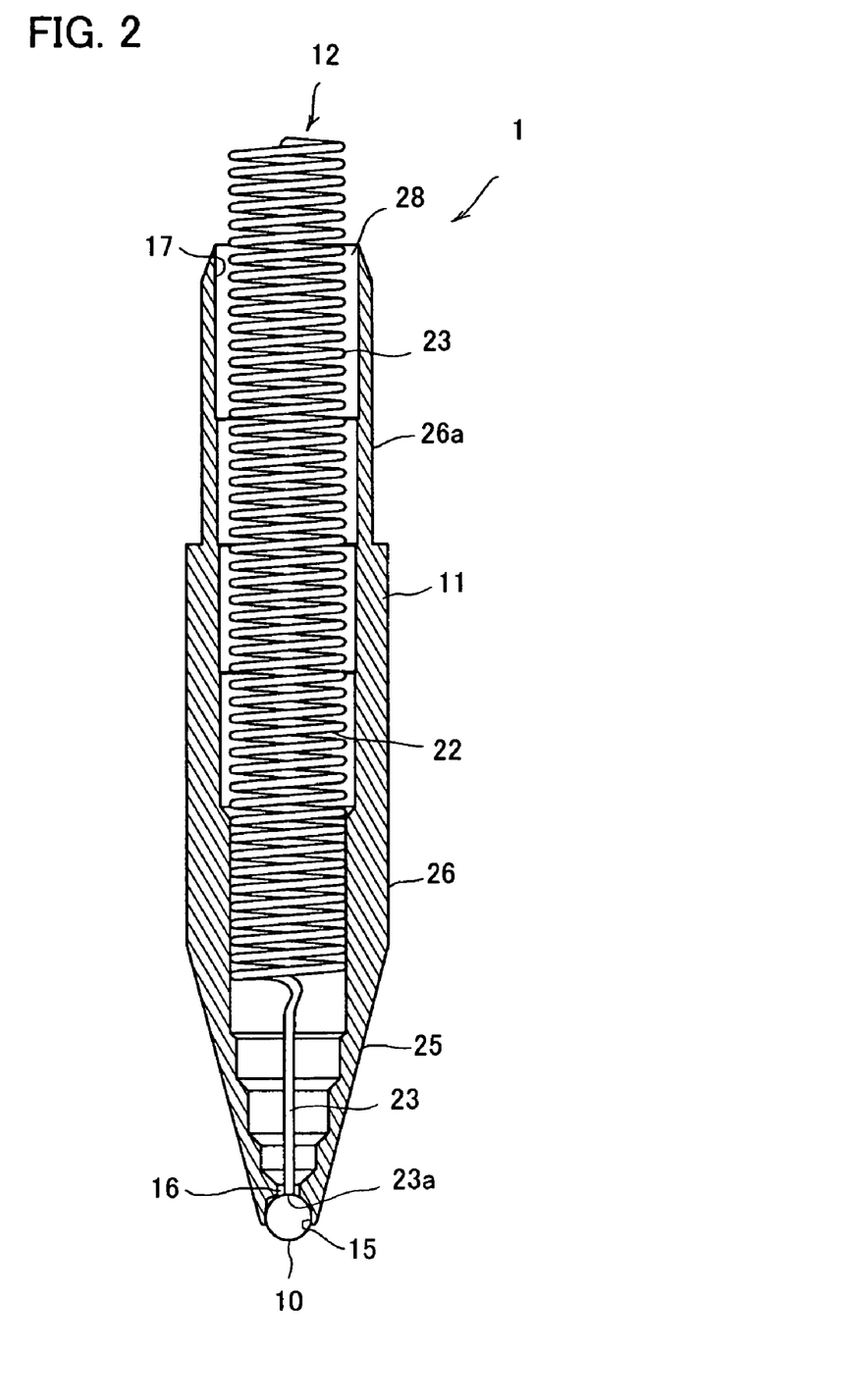
FIG. 2 is a cross-section showing a tip unit in the first embodiment of the present invention.

A ball 10 included in the distal end of the tip unit 1 is pushed against a writing surface such as a paper, running on the surface in accordance with moving of the ball-point pen 18, so that the ink 5 is led out through the tip unit 1 adhering to the ball 10 in appropriate amount, with the consequence that the ball-point pen 18 is used to write. The tip unit 1 will be more specifically described by referring to FIG. 2:

The tip unit 1 includes a tip body 11 used in a ball-point pen or a liquid applicator, and the ball 10 urged by an urging member 12. The tip body 11 has a substantially conical shape in its distal portion and a substantially cylindrical shape in its proximal portion, entirely appearing to be a rocket. In other words, the tip body 11 has a conically-shaped head 25 at its distal end, and a cylindrical shank 26 at its proximal end. The cylindrical shank 26 has at its proximal end a connecting step portion 26a whose outside diameter is slightly reduced to be connected to the ink cylinder 6. The tip body 11 includes a ball housing (a socket) 15, a capillary hole 16, and a proximal bore 17, all of which mutually communicate so as to enable liquid to flow toward the ball 10. The proximal bore 17 is open in a proximal end opening 28.

Figure 3A:
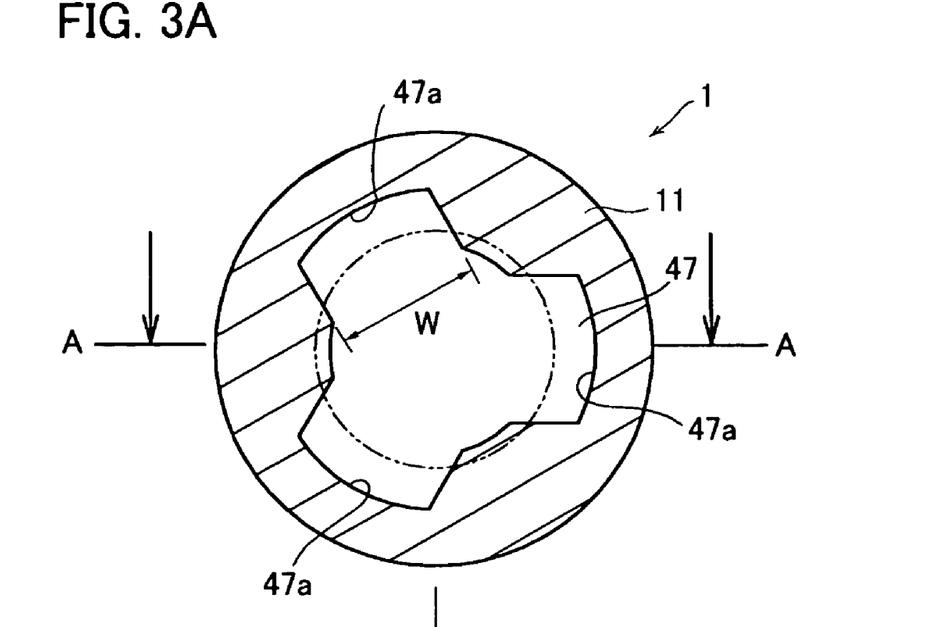
FIG. 3A is a cross-section showing a distal end portion of the tip unit shown in FIG. 2, wherein the ball is omitted for simplicity, and the view is seen from the distal end.
Figure 3B:
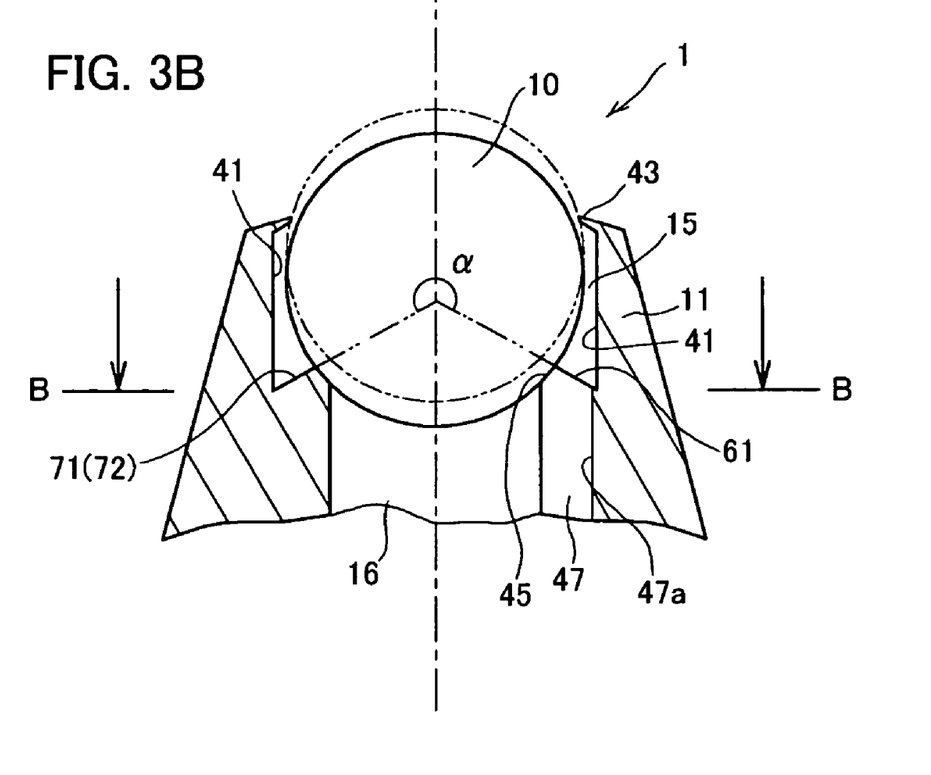
FIG. 3B is a cross-section taken along the line A-A in FIG. 3A.
Figure 4:
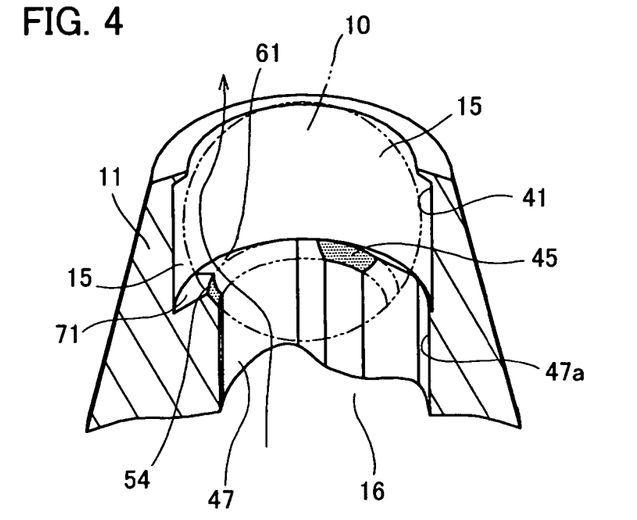
FIG. 4 is a perspective view showing the distal end portion of the tip unit shown in FIG. 2.

Referring to FIGS. 3A, 3B, and 4, the ball housing 15 includes a side wall 41 having a shape of a cylindrical inner wall, a ball resting seat 45 that is located near the proximal end of the side wall 41, and a connecting surface 71 connecting the seat 45 to the side wall 41. As described below, the seat 45 is formed by tapping, or pressing the ball 10 from the distal end toward the proximal end, so as to be inwardly curved.

As is evident from FIG. 3B, the connecting surface 71 has a truncated conical surface with its apex toward the distal end and is declined to the extent that its imaginary extension converges at one point with an angle ($\alpha$) 240°.

Furthermore, as shown in FIGS. 3A, 3B, and 4, the tip body 11 has ink channels 47 axially arranged on its inside wall around the capillary hole 16, communicating with the ball housing 15 so as to allow ink 5 effluent from the ink cylinder 6 to flow from the capillary hole 16 through the ink channels 47 and further outlets 61 of the ink channels 47 at the ball housing 15 to the ball housing 15. The channels 47 each extends radially from a recessed side wall portion, extending around the capillary hole 16, fully to a passage, defined by the capillary hole 16 and ball housing 15, so that the channels 47 open radially to be in direct radial communication with the ball continuously over an axial distance extending from the outlets 61 toward the proximal end of the tip unit 1.

As shown in FIG. 2, the ball 10 is urged by the urging member 12, which includes a spring part 22 that is a spring coil and a bar part 23 whose distal end 23a comes into contact with the ball 10.

The urging member 12 is accommodated in the tip body 11 and is constantly in a compressed state so as to push the ball 10 toward the distal end. As a consequence, when the pen 18 is not in use, the ball 10 blocks the distal end of the ball housing 15, thereby preventing ink 5 from flowing out. When the pen 18 is in use, writing pressure pushes the ball 10 towards proximal end, thereby causing the ball 10 to withdraw against the force of the urging member 12. Thus ink 5 flows out through a gap between the ball 10 and the ball housing 15.

The ball 10 is spherical, and is accommodated and rotatively held in the ball housing 15 of the tip body 11. More specifically, the ball 10 is supported by the seat 45 at its bottom, by the side wall 41 on its side, and by a deformed edge (deformed distal end portion) 43 at the head as best shown in FIG. 3B. As referred to below, the deformed edge 43 is obtained by pressing the distal end of the side wall 41 of the tip body 11 inwards after the ball 10 being placed into the ball housing 15.

Now, the process of producing the tip unit 1 will be described by referring to FIGS. 7 to 10:

First, the tip body 11 is produced from a solid cylindrical material, preferably capable of easily machining and drilling, such as free-cutting stainless steel, for example, DSR6F (trademark) manufactured by Daido Special Steel Manufacturing Co., Ltd. The material is cut to produce the distal end portion of the tip body 11 into a substantially conical shape so as to produce the conically-shaped head 25, whereas the proximal end portion is produced into a predetermined shape in the same manner. (the external machining step)

Next, an inside of the tip body 11 is drilled (the first step or the internal machining step) to form the proximal bore 17, the ball housing 15 and the capillary hole 16, and the ink channels 47 are formed in the channel broaching step described below.

More particularly, drilling from the distal end enables each of the ball housing 15 and the capillary hole 16 to have a circular cross-section perpendicular to an axis. By the drilling, the side wall 41, a seat-side machined surface 48 at the bottom, and the capillary hole 16 are formed.

The ball housing 15 has the side wall 41 having a shape of a cylindrical inner wall and the machined surface 48 at the bottom extending from the side wall 41 toward the axial center and being located between the side wall 41 and the capillary hole 16, specifically, between the proximal end of the side wall 41 and the distal end of the capillary hole 16. The machined surface 48 connects the capillary hole with the side wall 41.

The ball housing 15 and the capillary hole 16 are formed by drilling from the distal end of the tip body 11. The side wall 41 of the ball housing 15 and the capillary hole 16 are preferably co-axially with each other, but may be not.

The proximal bore 17 is formed by drilling from the proximal end of the tip body 11, preferably co-axially with the side wall 41 and the capillary hole 16.

Figure 6:
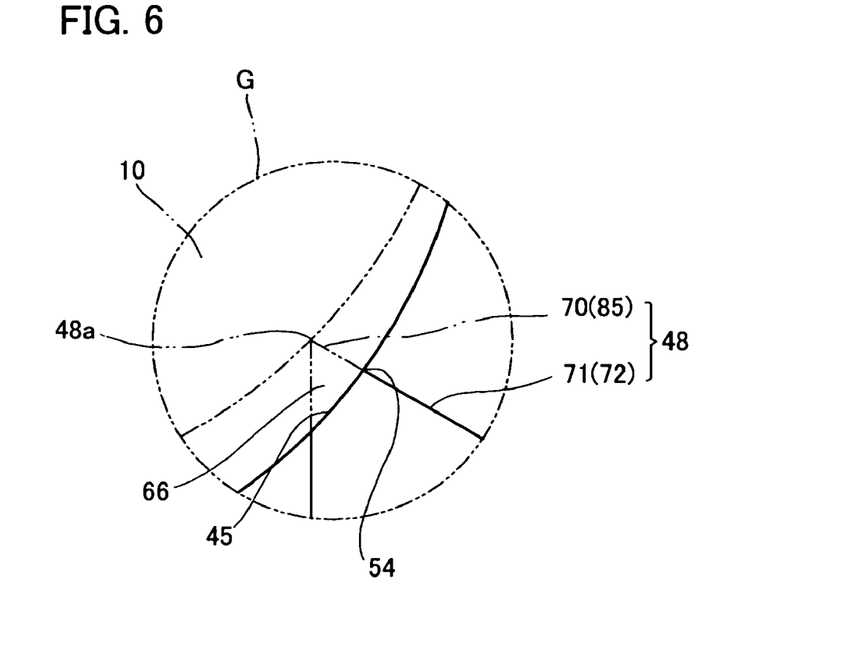
FIG. 6 is a view on a large scale showing the spot G in FIG. 5.

The machined surface 48 includes a pressure-deformation surface 70 deformed by tapping described below and the connecting surface 71. Referring to FIG. 6, the pressure-deformation surface 70 is tapped to be deformed into the seat 45 under the pressure of the ball 10.

As referred to above, the machined surface 48 has a shape of a truncated conical surface with its apex toward the distal end and a part of an imaginary cone. The machined surface 48 includes the pressure-deformation surface 70 and the connecting surface 71, wherein the pressure-deformation surface 70 positions forward and inward of the connecting surface 71, with an exterior angle (α) 240°. The angle (α) is a center angle of a cross section of a planer surface including an axis of the cone. The inner edge 48a of the machined surface 48 terminates at an acute angle.

In the first embodiment, the pressure-deformation surface 70 is a first surface 85 that is conically shaped with its apex toward the distal end. The connecting surface 71 is a non-pressure surface 72, which is undeformable surface free from the pressure of the ball 10. The ball housing 15 has its bottom with a convex center and a recessed outer side.

Figure 7:
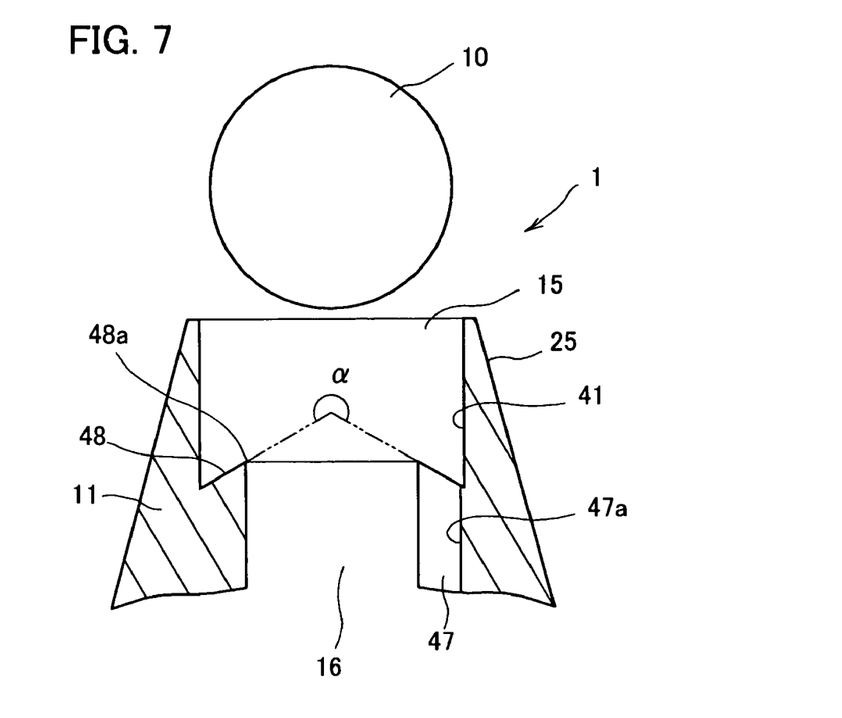
FIG. 7 is a cross-section showing the distal end portion of the tip unit in process.

Next, the process proceeds to the second stage or the channel broaching step where the ink channels 47 are formed, and also the tip body 11 is formed as shown in FIG. 7.

The ink channels 47 are produced by cutting the side wall of the capillary hole 16 so as to be open toward the capillary hole 16. The present embodiment illustrated in FIG. 3A has three ink channels 47 at equal angular intervals. As shown in FIG. 3B, a recessed wall/side wall portion 47a bounding each of the ink channels 47 faces radially inwardly and is substantially flush with the side wall 41 of the ball housing 15. Total length of three of circumferential width W of each recessed wall portion 47a is about a half (more than one third) of circumferences of an imaginary circle passing through the recessed wall portions 47a. Therefore, the ink channels 47 are circumferentially wide and axially large enough to allow an increased amount of ink 5 to flow through to the ink channels 47.

Figure 8:
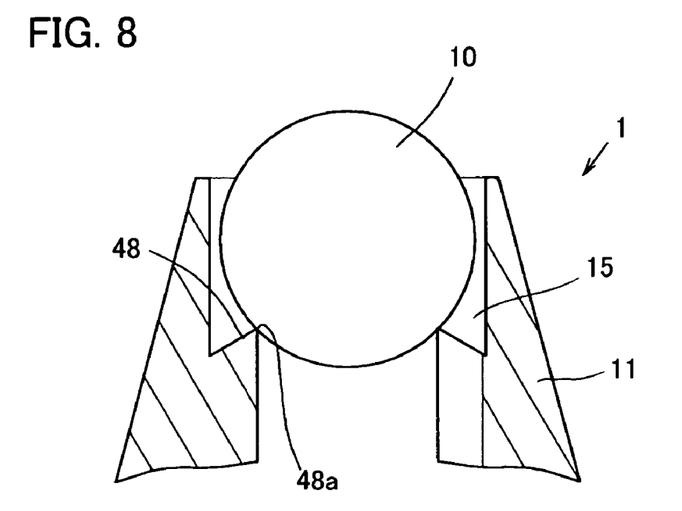
FIG. 8 is a further cross-section showing the distal end portion of the tip unit in process.
Figure 9:
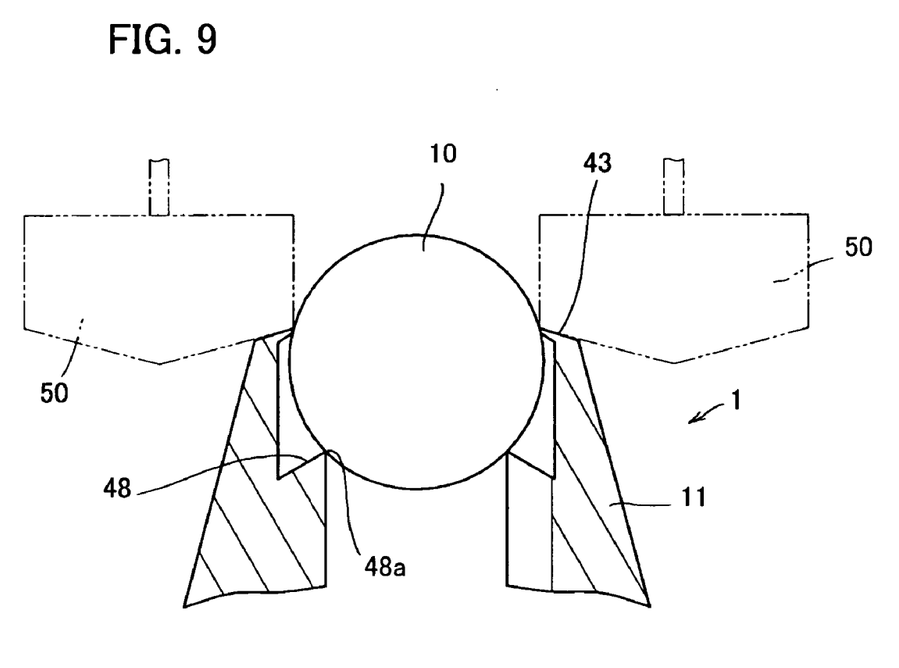
FIG. 9 is a still further cross-section showing the distal end portion of the tip unit in process.

As the third stage or the ball placing step, the ball 11 is placed in the ball housing 15 of the tip body 11 as shown in FIG. 8. The ball 10 rests on the inner edge 48a of the machined surface 48. At this stage a roller 50 is driven to press the distal end of the tip body 11 inwards (toward the ball 10) so as to obtain a deformed edge 43 as shown in FIG. 9 (the edge-deforming step), wherein substantially no gap exists between the deformed edge 43 and the ball 10.

Figure 10:
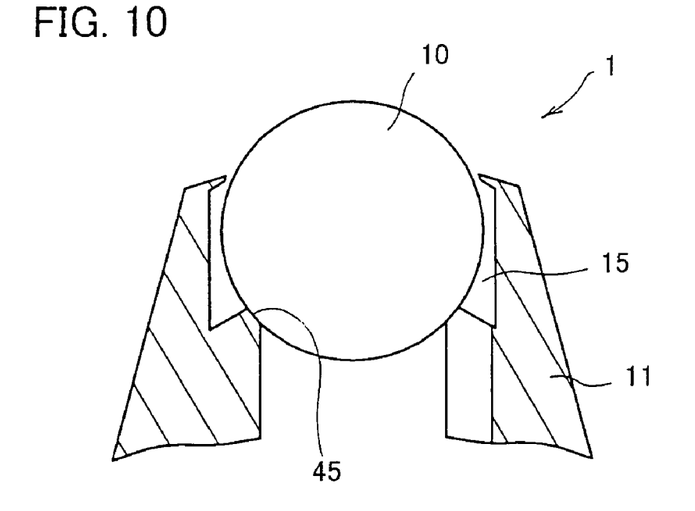
FIG. 10 is a yet still further cross-section showing the distal end portion of the tip unit in process.

In this way, by tapping by forcing the ball 10 from the distal end into the ball housing 15, the pressure-deformation surface 70 of the machined surface 48 in contact with the bottom end of the ball 10 is deformed to form the seat 45 (the seat-deforming step). At this stage the ball 10 is moved backward towards the proximal end by a predetermined distance. The hardness of the ball 10 is in the range of 1500 to 2000 Hv, and that of the ball housing 15 is in the range of 200 to 280 Hv. Since the ball 10 is harder than the ball housing 15, the pressure-deformation surface 70 is deformed in compliance with the spherical shape of the ball 10. In this way, the tip unit 1 is finished as shown in FIG. 10.

Advantageously, in the present embodiment, the seat-side machined surface 48 has the inner edge 48a acutely projecting upward, thereby being easily tapped. As shown in FIG. 6, acute angle of the inner edge 48a enables a deformed part 66 to have a reduced volume deformed by tapping without using a strong force.

Figure 5:
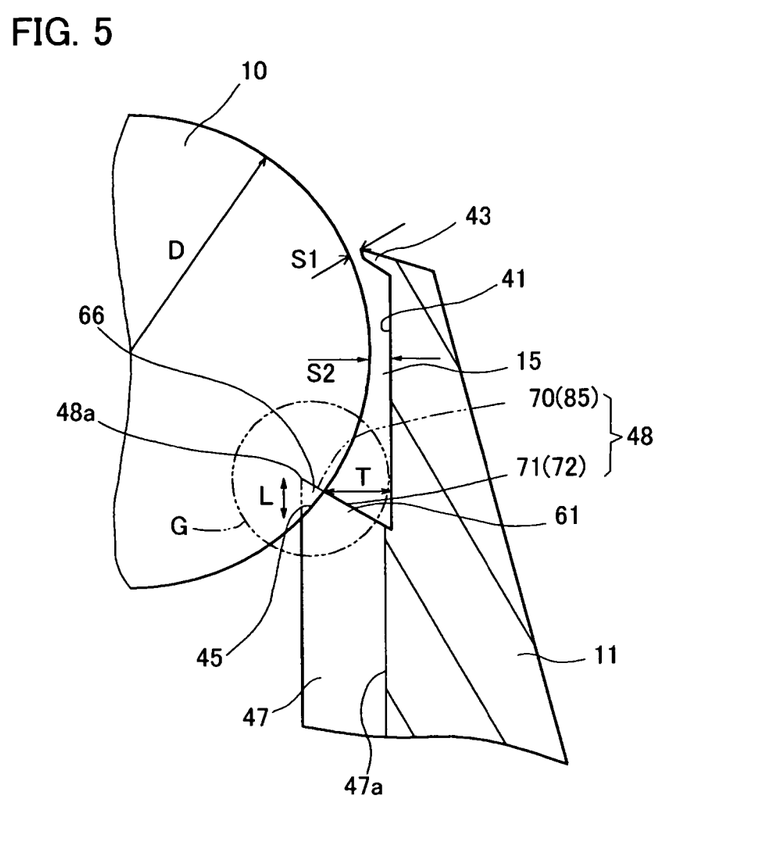
FIG. 5 is a cross-section on an enlarged scale showing a spot where a ball in the tip unit is kept in contact with the tip body.

By the tapping, the ball 10 slightly moves backward, thereby forming a gap S1 between the deformed edge 43 of the tip body 11 and the ball 10, as shown in FIG. 5. The surface of the seat 45 formed by tapping is curved or concave in compliance with the spherical surface of the ball 10.

In using the pen 18, pushing the ball 10 from the distal end towards the seat 45 by writing pressure allows the ball 10 to come into contact with the whole surface of the seat 45, as shown in FIG. 5. Further, as shown in FIG. 6, the distal edge 54 at the boundary between the seat 45 and the connecting surface 71 is brought into contact with the ball 10.

As shown in FIG. 2, the ball 10 is urged toward the distal end by means of the urging member 12. Then, as shown in FIG. 1A, the ink cylinder 6 is installed and ink 5 is filled therein, so as to obtain the core unit 7. Finally, as shown in FIG. 1B, the core unit 7 is encased in the cylindrical shaft 19. Thus, the ball-point pen 18 is finished, wherein the core unit 7 has an ink follower 8 in the proximal end of the ink cylinder 6.

The ink follower 8 can be made of non-volatile or less-volatile organic gel, such as one or more substances selected from the group consisting of silicon oils, mineral oils, and polybutene. The ink follower 8 made of such substances allows the ink 5 to flow smoothly even when ink is discharged in a relatively large rate.

As shown in FIG. 5, the tip unit 1 in the present embodiment has gaps T, S1, and S2. The gap T exists against the ball 10 near the outlet 61 of the ink channel 47, the gap S2 exists at the spot where the ball 10 is nearest to the side wall 41 of the ball housing 15, and the gap S1 exists against the ball 10 near the deformed edge 43 of the tip body 11.

When the pen 18 is used, the ink 5 flows from the capillary hole 16 through the gap T of the outlet 61 of the ink channel 47 at the ball housing 15 to the ball housing 15, and further flows outside through the gap S1 via the gap S2.

The sizes of the gaps T, S1, and S2 are determined in accordance with the outside diameter D of the ball 10, the deformed amount L, and the inside diameter of the side wall 41 of the ball housing 15.

The disadvantages of a known tip unit 120 shown in FIGS. 18 and 19 are that as the deformed amount L becomes larger, the gap S1 becomes wider, with the consequence of the fact that the distal edge 54 at the boundary between a seat 105 and the connecting surface 71 shifts outward. This outward shifting causes a decrease of the gap T with the ball 10 near the outlet 61 of the ink channel 47 in accordance with an increase in the deformed amount L. If the deformed amount L is decreased, the gap T becomes wider because of the inward shifting of the distal edge 54, but on the other hand the gap S1 becomes narrower.

In contrast, according to tip unit 1 in the present invention, as shown in FIG. 6, the pressure-deformation surface 70 is formed so as to be a truncated conical surface with its apex toward the distal end, thereby minimizing the outward shifting of the distal edge 54 even when the deformed amount L is large. This minimized outward shifting leads to a relative increase of the gap T, thereby discharging more amount of the ink 5.

It is also possible to make the gap S2 where the ball 10 nearest approaches the side wall 41 to be narrower than either of the gaps T and S1. That ensures regulating of flow rate of the ink 5 by restricting excess flow of the ink 5 at the gap S2.

As described above, the known liquid applicator cannot increase both the gaps S1 and T, and therefore, one of them remains narrow, thereby preventing an increase of flow rate of liquid. Furthermore, if the flow rate is regulated at the gaps S1 and T, the gaps S1 and T change in size because of the irregularity of the deformed amount L, failing to stably regulate the flow rate. In contrast, the tip unit 1 embodying the present invention broadens both the gaps S1 and T with the minimum pressing force, Furthermore, another advantage is that the flow rate is regulated at the gap S2 determined by the diameters of the ball 10 and the side wall 41, both of which are precisely finished, thereby ensuring precisely regulating flow rate in a liquid applicator using plenty of liquid effluent therefrom.

According to the tip body 11 embodying the present invention, the pressure-deformation surface 70 of the tip body 11 is a truncated conical surface with its apex toward the distal end, thereby making the gap T wider than the known tip body 100 even with the deformed amount L in the same length as the known tip body 100 as shown in FIG. 19 and the like.

Figure 11:
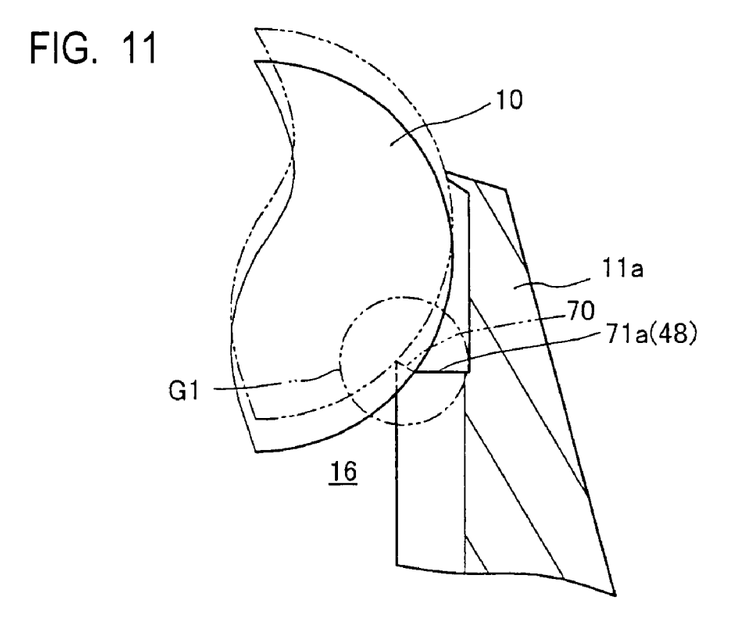
FIG. 11 is a cross-section showing a distal end portion of a tip unit in a modified embodiment of the present invention.
Figure 12:
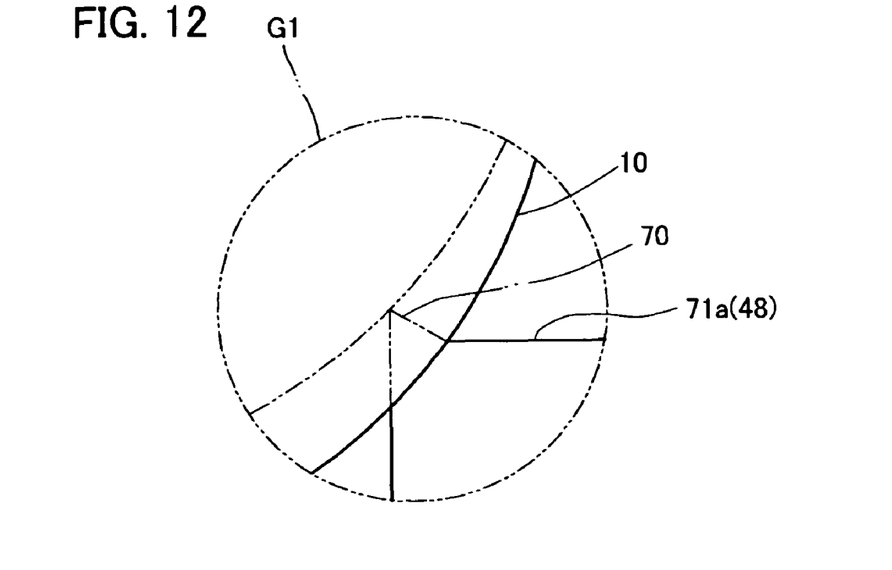
FIG. 12 is a view on a large scale showing the spot G1 in FIG. 11.

Modified embodiments will be described below in detail:

Another embodiment is shown in FIGS. 11 and 12 using a tip body 11a. The only difference from the first-mentioned tip body 11 is in the shape of the seat-side machined surface 48 of the tip body 11a; more specifically, in the shape of its connecting surface 71a of the machined surface 48 of the tip body 11a compared with the machined surface 48 of the above-mentioned tip body 11, while the pressure-deformation surface 70 remains the same. The connecting surface is a planar surface perpendicular to the axis.

The tip body 11a has the pressure-deformation surface 70 of the machined surface 48 deformed into a truncated conical surface with its apex toward the distal end, but has the connecting surface 71a that has a different shape from the pressure-deformation surface 70. The tip body 11a can widen the gap T in the case of the same deformed amount L as well as the tip body 11 in the first embodiment. Herein, the connecting surface 71a may not be a plane surface perpendicular to the axis, provided that the ball 10 is kept in contact with the surface 71a after the deformation is performed.

Figure 13:
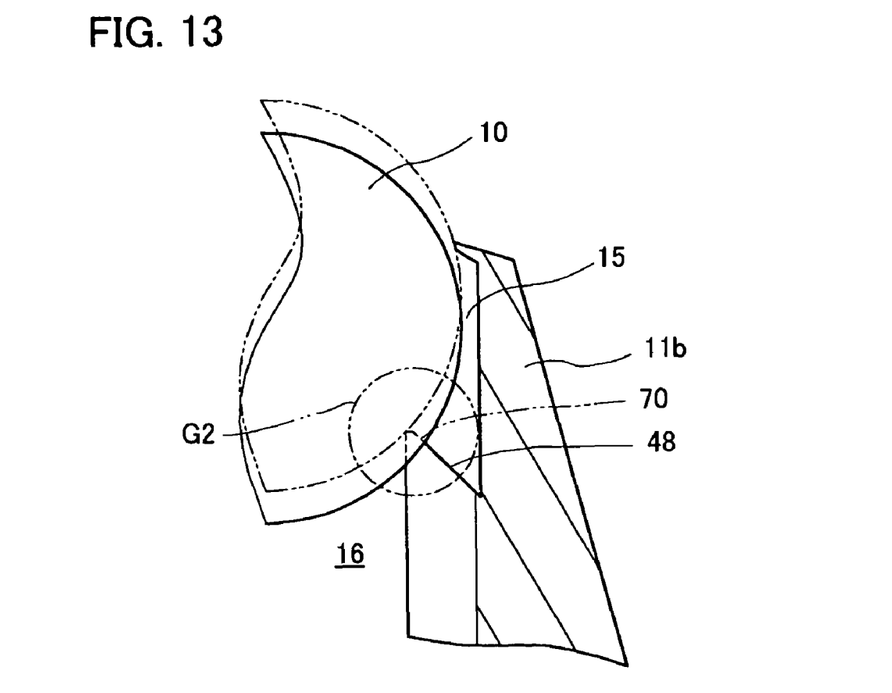
FIG. 13 is a cross-section showing a distal end portion of a tip unit in a further modified embodiment of the present invention.
Figure 14:
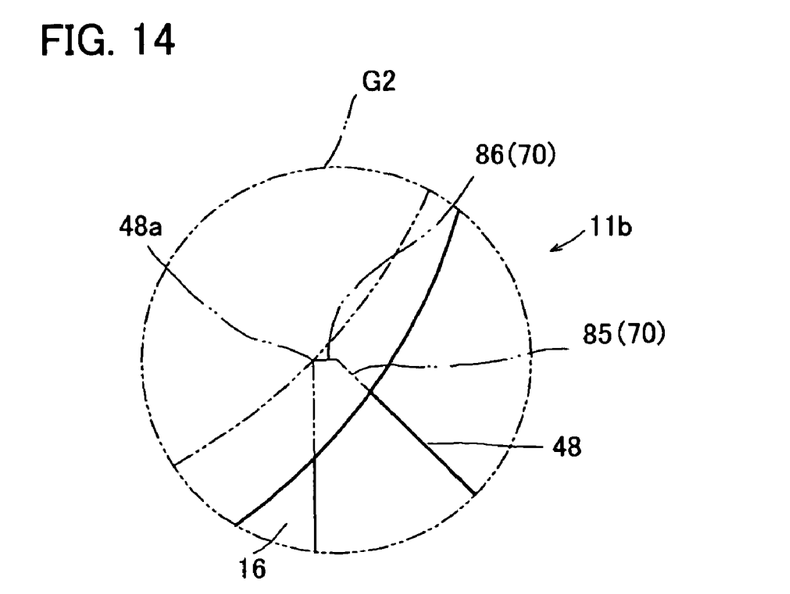
FIG. 14 is a view on a large scale showing the spot G2 in FIG. 13.
Figure 15:
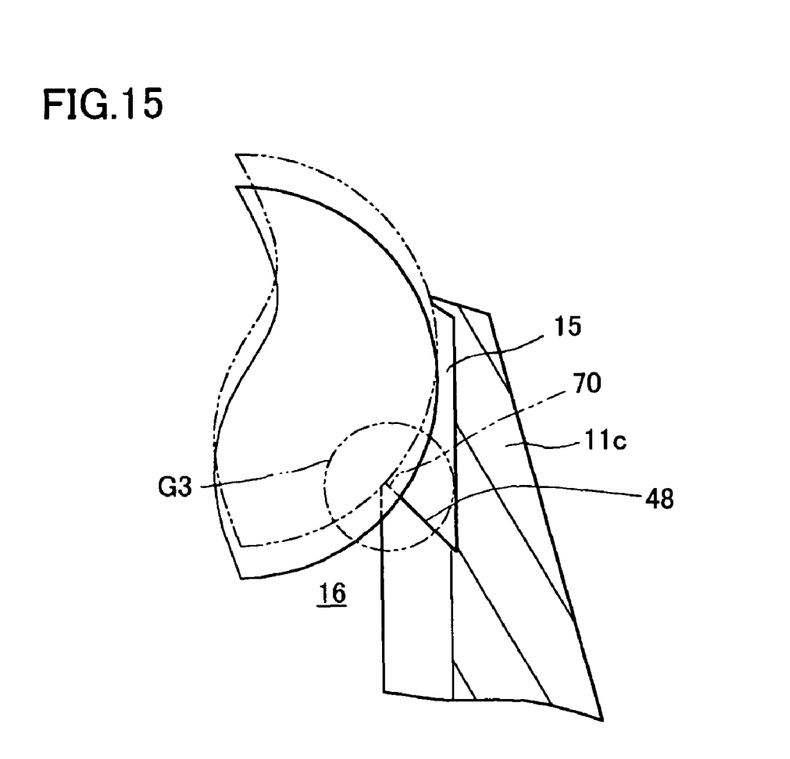
FIG. 15 is a cross-section showing a distal end portion of a tip unit in a still further modified embodiment of the present invention.
Figure 16:
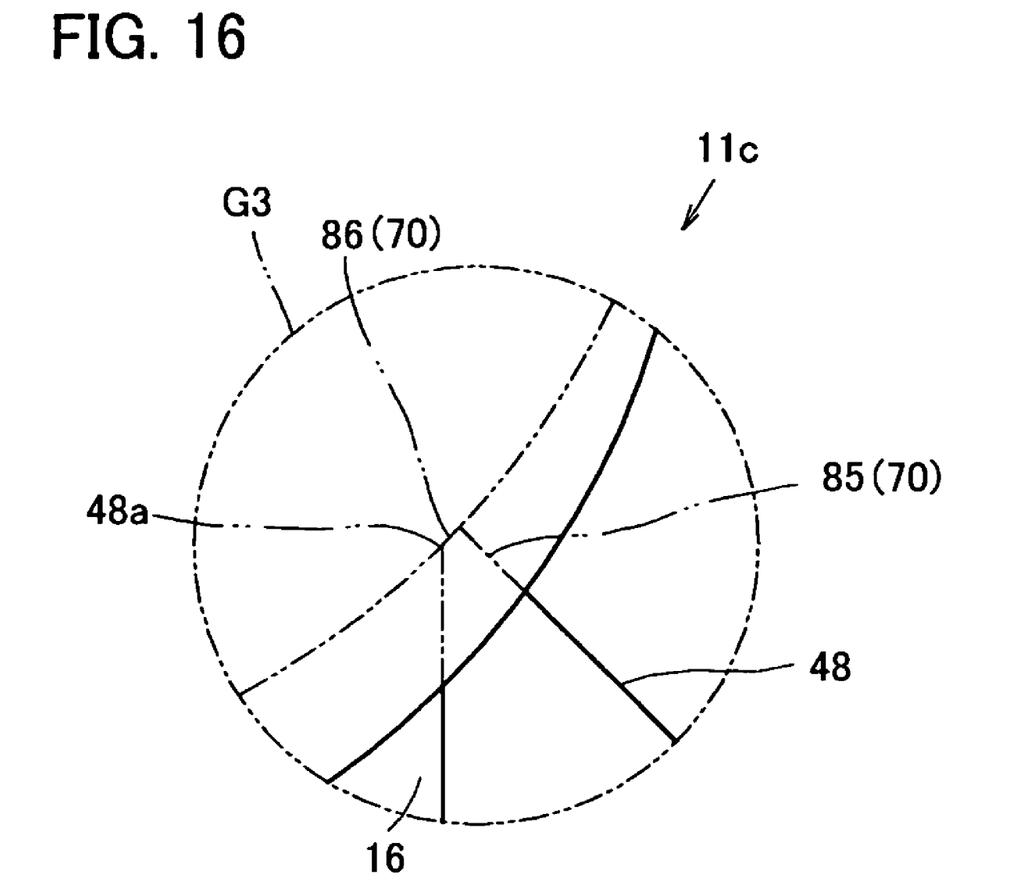
FIG. 16 is a view on a large scale showing the spot G3 in FIG. 15.

A third embodiment is shown in FIGS. 13 and 14 using a tip body 11b, wherein the tip body 11b is provided with a modified seat-side machined surface 48, and a fourth embodiment is shown in FIGS. 15 and 16 using a tip body 11c, wherein the tip body 11c is provided with a further modified seat-side machined surface 48. Specifically, the features in each of the third and fourth embodiments is in the shape of the machined surfaces 48 near the end in the side of the capillary hole 16, i.e., near the inner edge 48a as shown in FIGS. 14 and 16, which is different from the first and second embodiments.

More particularly, each of the pressure-deformation surfaces 70 of the tip bodies 11b and 11c is provided with a second surface 86 that is not flush with the first surface 85.

As shown in FIG. 14, the second surface 86 of the tip body 11b is located near the capillary hole 16, and is a planar surface perpendicular to the axis of the tip body 11b. As shown in FIG. 16, the second surface 86 of the tip body 11c is located near the capillary hole 16, and is a truncated conical surface with its apex toward the proximal end.

One advantage of the tip bodies 11b and 11c is that the ball 10 stably positions in the ball housing 15, without distortion in tapping because of the second surfaces 86.

The ink 5 used in the above-mentioned embodiments, which is a water-based ink or a water-based gel ink, is preferably selected among inks adapted to increase discharge. For example, the following inks may be used:

(1) ink containing at least adhesive synthetic resin emulsion and water in the form of capsular film-making ingredients;

(2) the ink specified in (1) at least whose 30% wt in the whole amount of the ink or more is occupied by the adhesive synthetic resin emulsion;

(3) the ink specified in (1) whose viscosity is in the range of 5 mPa·s to 100 mPa·s (by an ELD type viscometer, 1° 34' cone-rotor, 10 rpm, 20° C.);

(4) the ink specified in (1) whose emulsion contains groups of particles having multiple grain-size distributions;

(5) the ink specified in (1) whose emulsion is of a type having a lowest film-making temperature (MFT) of 25° C. or less;

(6) the ink specified in (1) containing an adhesive synthetic resin emulsion having an MFT of 5° C. or less and another adhesive synthetic resin emulsion having an MFT of at least 50° C.;

(7) the ink specified in (1) containing a colorant;

(8) the ink specified in (7) whose colorant is a pigment containing metal, further containing a thickener;

(9) the ink specified in (1) wherein the adhesive synthetic resin emulsion is selected at least from the group consisting of acrylic synthetic resin and styrene-based synthetic resin emulsion;

(10) the ink specified in (1) containing a film-making agent capable of plasticizing the film-making synthetic resin emulsion; or (11) the ink specified in (1) containing a perfume.

The preferred types of ink used for the present invention are not limited to the above-listed types of ink, but an oily ink, a whiteout liquid, and any other types of liquid can be used.

The discharge amount Z of ink in writing with the use of the ball-point pen 18 can be at least 100 mg/10 m.

Further, suppose that the ball 10 has an outside diameter D (mm), the writing thickness formed by writing H (μm)×$10^3$, and the discharging amount of ink in writing Z (mg/10 m). Then, if the relationship among D, H, and Z in the pen 18 satisfies at least one of the following conditions (1) to (3), the pen 18 can be used. Herein, the discharging amount of ink Z (mg/10 m) means the discharging amount (mg) in writing for 10 m:

(1) a ball-point pen whose H×$10^3$/D, which is a ratio of H to D, is 15 or more;

(2) a boll-point pen whose Z/D, which is a ratio of Z to D, is 125 or more; or (3) a ball-point pen whose H×$10^3$/D is 15 or more, and Z/D is 125 or more.

The pen 18 satisfying the above-mentioned requirements can be made at ease by adjusting the ink gradients, the viscosity and the ball diameter.

The first embodiment is provided with the urging member 12, but it can be omitted.

The present application hereby incorporates complete contents described in Japanese Applications Nos. 2003-149512, 2003-149491, and 2003-149640 by reference herein.

INDUSTRIAL APPLICABILITY

As described above, the tip unit of the present invention can be advantageously used for liquid applicators expected to deliver a comparatively large amount of the liquid. Furthermore, according to the method of producing the tip unit of the present invention, the tip units can be readily produced.

The invention claimed is:

1. A tip unit used for a liquid applicator, the tip unit having an axis and comprising a tip body and a ball, the tip body having proximal and distal ends and holding the ball near the distal end, the tip body having a ball housing adapted to hold the ball, a capillary hole, and a proximal bore, the ball housing, the capillary hole, and the proximal bore mutually communicating to form a passage for permitting liquid to flow, the ball housing having a side wall and a ball resting seat holding the ball rotatably and axially movably at a predetermined distance in the ball housing, the tip body further having a channel so as to enable the ball housing to communicate with the capillary hole and the proximal bore, the ball housing further having an axially facing connecting surface that is directly connected to the side wall, connects the seat with the side wall and has a shape projecting angularly away from the side wall toward the distal end of the tip body, the seat being located radially inside the connecting surface, the tip unit further having a side wall portion extending around the capillary hole, the channel having a length extending along the axis of the tip unit, a radial depth, and a circumferential width, the channel extending radially from the side wall portion fully to the passage so that the channel opens radially to be in direct radial communication with the ball over an axial distance extending from an outlet, where the channel communicates with the ball housing, toward the proximal end of the tip unit.

2. The tip unit according to claim 1, wherein the connecting surface has a shape of a truncated conical surface with its apex toward the distal end of the tip unit.

3. The tip unit according to claim 1, wherein the ball housing is provided with a recess at its bottom.

4. A liquid applicator incorporating the tip unit according to claim 1.

5. The liquid applicator according to claim 4, wherein the liquid applicator is a ball-point pen using a water-based ink or a water-based gel as the liquid.

6. The liquid applicator according to claim 4, wherein the ball is urged toward the distal end.

7. The tip unit according to claim 1, wherein the connecting surface is directly connected to the seat.

8. The tip unit according to claim 1, wherein the ball has a convex outer surface and the seat has a surface that conforms to the convex outer ball surface.

9. The tip unit according to claim 8, wherein the seat surface has a concave shape that closely conforms to the outer ball surface.

10. The tip unit according to claim 1, wherein the channel extends axially to the connecting surface.

11. The tip unit according to claim 1, wherein the tip body has a plurality of channels the same as the first claimed channel, each of the channels is bounded by a radially recessed wall portion facing radially inwardly and the radially recessed wall portions have a total circumferential extent equal to at least one third of a circumference of a circle passing through the plurality of recessed wall portions.

* * * * *